Sept. 2, 1930.  S. KATZ  1,774,751
METHOD OF AND MEANS FOR CONTROLLING RECIPROCATING ELECTRIC MOTORS
Filed May 27, 1924
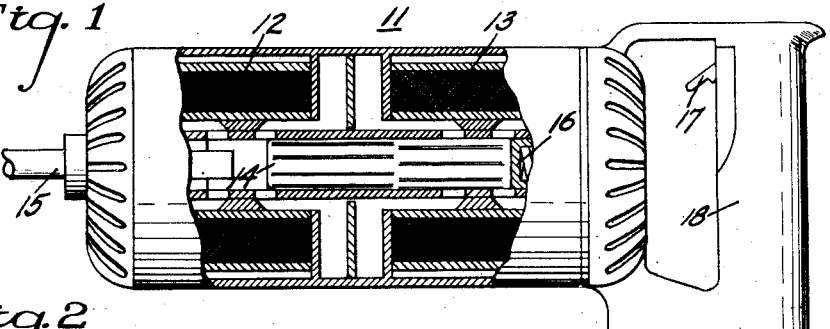
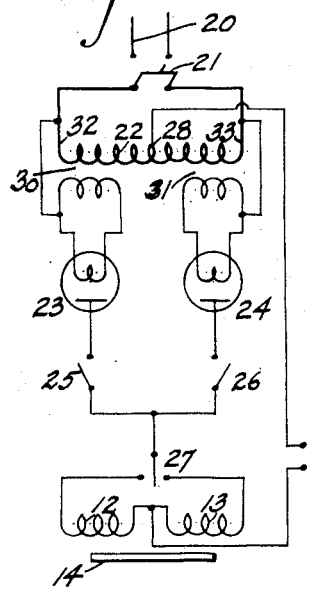
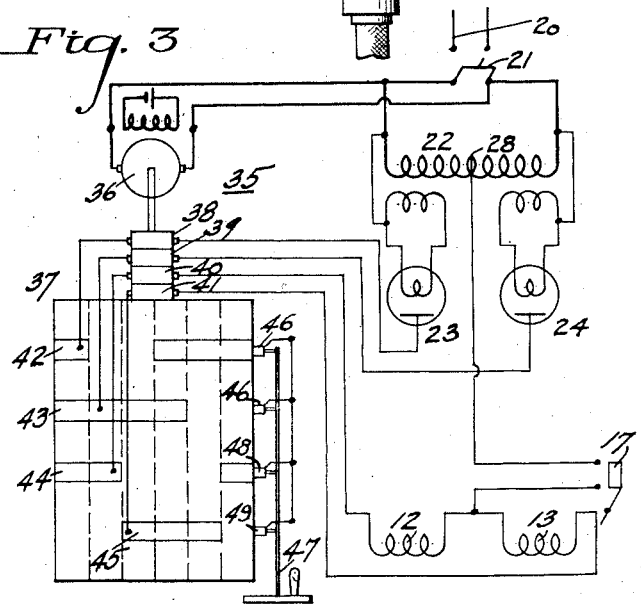
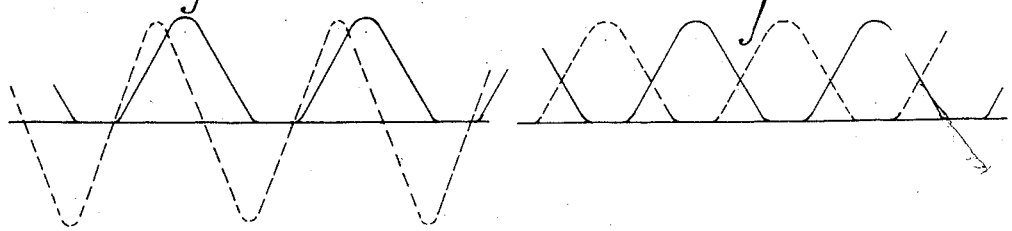
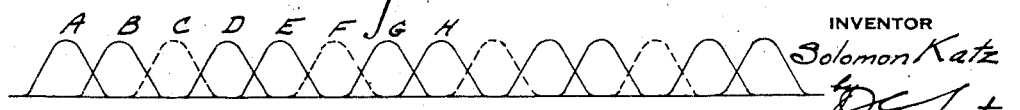
INVENTOR
Solomon Katz
Attorney Patented Sept. 2, 1930

1,774,751

UNITED STATES PATENT OFFICE

SOLOMON KATZ, OF PITTSBURGH, PENNSYLVANIA, ASSIGNOR TO SYNTRON COMPANY, A CORPORATION OF DELAWARE

METHOD OF AND MEANS FOR CONTROLLING RECIPROCATING ELECTRIC MOTORS

Application filed May 27, 1924. Serial No. 716,138.

My invention relates to reciprocating motors and particularly to motors employed for percussive purposes to do useful work, such as drilling or riveting.

One object of my invention is to provide a method of and means for controlling a reciprocating motor whereby it may be energized from an alternating current circuit and controlled to operate at a frequency dependent upon but lower than that corresponding with the frequency of the alternating current source.

Another object of my invention is to provide a system of control for the reciprocating motor whereby a relatively powerful working stroke of long duration may be obtained.

Another object of my invention is to provide a system for controlling a reciprocating motor having two field producing windings by energy derived from an alternating current circuit, which involves the supply of cumulatively effective dephased energy impulses to each winding of the motor.

In controlling the energization of a reciprocating motor comprising two windings that operate alternately upon a movable core member, it is desirable to interrupt the circuit of each winding alternately or to transmit energy impulses to the respective windings alternately. If the circuits of the windings are to be interrupted, they should be interrupted during zero current values. Interruption of the circuits at any other time involves arcing between the separating contact surfaces and their gradual deterioration.

By reason of the inductive nature of the windings and the variation of the inductance of the winding circuit caused by the moving core of the motor, it is essential to provide a current controlling device which is unaffected by such variations and which will interrupt the circuit at zero current values to obviate arcing.

In accordance with the principle of my invention, I employ an electric valve, such as a vacuum valve, having such characteristics as to transmit only current having a predetermined polarity, in cooperation with a synchronous switch to control the energization of the windings of a reciprocating motor employed as a percussive tool or electric hammer. The switch alternately maintains the circuit connection of each winding of the hammer for the duration of a complete wave or impulse.

In an application, Serial No. 541,517, filed March 6, 1922, by Carl S. Weyandt, relating to systems for operating reciprocating electric motors, is disclosed a system for controlling a reciprocating motor whereby it may be caused to operate in synchronism with the frequency of the impressed voltage.

When energized from a 60 cycle circuit, the motor makes 3600 strokes per minute. This high frequency operation is highly desirable for stone working, such as drilling and chipping, but is too high for other applications such as metal working, which requires a long powerful stroke.

In Letters Patent No. 1,723,830, granted August 6, 1929, to C. S. Weyandt, and relating to a method of and means for controlling reciprocating motors, is disclosed a system involving a reciprocating motor having actuating elements or solenoids each comprising a plurality of cumulatively effective windings. Two electric valves are provided to translate the waves of an alternating current derived from a single phase source of waves of the same polarity. A synchronous switching device, such as a synchronous motor-driven switch, connects the respective windings of the actuating elements, in succession, to the circuit through the rectifiers to permit the windings to be energized by a train of overlapping waves of one polarity.

The switching device selectively connects the circuit to the winding which is to be energized and the valve selectively transmits predetermined current waves. The switching device is so designed as to effect the switching operation during an interval of zero current.

Since the windings of the actuating elements of that motor are cumulatively effective, the overlapping force impulses constitute large energy impulses of relatively long duration which control the actuation of the movable member of the motor accordingly. Operation of that nature renders the motor suitable for metal working such as riveting, that requires a long powerful stroke.

In the present application I provide a system for controlling a reciprocating motor of standard construction comprising single-winding solenoids in such manner as to obtain the combination of energy impulses to constitute a large energy impulse of relatively long duration to render the motor suitable for work of the nature referred to, requiring a long powerful stroke.

In order to energize the motor from a single phase circuit, which is the one ordinarily available at electric lamp sockets, I employ a single-winding reactive device in the nature of an auto-transformer to provide an artificial neutral point. An electric valve of the two element electronic type is connected between each conductor of the circuit and one terminal of each of the solenoids of the motor through a suitable switching device which serves to connect the valves to the respective windings for the duration of a predetermined number of current waves. The other ends of the solenoids are joined to the neutral point of the transformer device.

By means of the switching device which in the present system comprises a synchronous motor-driven drum with suitable contact segments and engaging fingers, a predetermined number of consecutive overlapping and cumulatively effective current wave impulses are transmitted to the respective windings in sequence. Relatively large force impulses of long duration are produced which develop powerful strokes in the motor.

In the accompanying drawings, Fig. 1 is a longitudinal view, partially in section, and partially in elevation, of an electric hammer of the reciprocating motor type to be controlled in accordance with the principles of my invention;

Fig. 2 is a simple diagrammatic view illustrating the circuit connections involved in controlling the energization of the hammer illustrated in Fig. 1;

Fig. 3 is a complete diagrammatic view of the system illustrated in Fig. 2 and shows the arrangement and disposition of the synchronous switch which controls the energization of the operating windings of the hammer;

Fig. 4 is a graph illustrating the wave form of current impulses transmitted by one electric valve;

Fig. 5 is a graph illustrating the relative disposition and form of the current impulses transmitted by both valves; and Fig. 6 is a graph illustrating the relative disposition and form of the current wave impulses that are utilized and of those that are not utilized.

In applying a reciprocating motor, particularly of the percussive tool type, in metal working, and under analogous circumstances requiring low frequency operation, the conditions encountered are different from those encountered in stone working, such as drilling and chipping, for which a high frequency motor hammer is adaptable. Metal working requires a long powerful stroke. To obtain such a stroke in a reciprocating hammer energized from a commercial circuit is an object of my invention.

In order to obtain a stroke of long duration, which is in effect a reduction of the speed or frequency of operation of the motor hammer, I provide means for supplying to the respective actuating elements or solenoids of the hammer a plurality of current waves or impulses. Since a plurality of current waves are alternately utilized to energize the solenoids of the motor, the speed of the movable element or core operating between the solenoid is reduced accordingly relative to the frequency of the supply system.

As illustrated in Fig. 1, the hammer 11 comprises two main operating windings or solenoids 12 and 13 which operate alternately to impress an actuating force upon a movable core member 14 to cause it to reciprocate between a tool 15 and a spring cushioned backstop or bumper 16. When actuated on its forward stroke by the solenoid 12, the core 14 strikes the tool 15 causing the latter to do useful work such as drilling, chipping, riveting, etc. When actuated in a backward direction by the coil 13, the core 14 engages the backstop 16 and stores its kinetic energy in the backstop until actuated in a forward direction again by the solenoid 12. The operation of the hammer may be readily controlled by the operator by means of a trigger switch 17 that is mounted upon the handle 18.

As illustrated in Fig. 2, energy for operating the hammer is derived from an alternating current circuit 20 and supplied to the hammer windings through the switch 21 and transformer 22, electric valves 23 and 24 or equivalent rectifiers, or asymmetric conductors, and a suitable switching means 25, 26 and 27. The trigger switch 17 serves to connect a terminal of each solenoid 12 and 13 to a neutral point 28 established by the transformer 22.

When the switch 21 is closed to connect the transformer winding 22 to the circuit 20, two smaller transformer windings 30 and 31 become energized to supply current to the filaments of the associated electric valves 23 and 24 respectively, to render those filaments incandescent and electron emitting. The filament of valve 23 is connected to terminal 32 of the transformer 22 and the filament of valve 24 is connected to the terminal 33 of the transformer 22.

The electric valves 23 and 24 are of such character as to transmit current only when the filament is negative with regard to the plate. By reason of the inductive nature of the solenoids 12 and 13 of the hammer, when the circuit polarity is such that one of the valves will transmit current, the resulting current impulse that is effective to energize the solenoid winding is of the form illustrated by the solid line curve in Fig. 4. The dotted line curve illustrates the electro-motive force of the main or supply circuit and the solid line curve illustrates the form of a current wave which traverses the solenoid to which the associated valve has just been connected. It will be seen that the duration of each current wave or impulse is of the order of 270 electrical degrees. The prolonged duration of this current wave impulse appears to be due to the positive transmission of current by the valve during the interval of proper polarity for current transmission by that valve, and also to the current caused to traverse the solenoid when the energy stored in the electromagnetic field of the solenoid is restored to the circuit. Such electromagnetic energy is restored to the circuit when the polarity of the main circuit changes from that during which the valve transmits current to the opposite polarity.

In Figure 5 is illustrated a graph of the currents traversing the common circuit between switching devices 25 and 26 and the transfer switching device 27 to both solenoids 12 and 13. In that figure are illustrated both sets of current impulses as transmitted by both valves 23 and 24. It will be observed that the current wave impulse transmitted by the valve 23, shown in solid line, overlaps the current wave impulse transmitted by the valve 24, shown in broken line.

By operating the switching devices 25, 26 and 27, at proper intervals, any number of current wave impulses may be selectively directed to the respective solenoids in sequence. For example, two current wave impulses may be directed to each of the two solenoids in such manner as to transmit combined current impulses to the respective solenoids in the manner illustrated by the graph shown in Fig. 6. Thus, switch 25 should be closed to permit the valve 23 to transmit wave A of Fig. 6 and switch 26 should then be subsequently closed to permit valve 24 to transmit wave B of Fig. 6. While both such waves were being transmitted, switch 27 should be closed on its left hand side to direct the current impulses A and B to the solenoid 12 and thereby cause core 14 to make a powerful stroke forward to strike the tool 15.

The current wave impulse C, shown in dotted line, should then be permitted to pass unutilized by opening the switches 25 and 26 for the duration of the interval during which such current wave impulse would traverse the circuit, if utilized.

The transfer switch or device 27 should then be closed on its right hand side to connect the solenoid 13 in circuit, and the switching devices 26 and 25 should be closed to transmit current wave impulses D and E from the valves 24 and 23, consecutively to cause the backward stroke of core 14. After such energization of the solenoid 13, the transfer switch 27 should again shift to connect the solenoid 12 in circuit and direct the current wave impulses G and H to that solenoid after permitting an interval to elapse corresponding to the time during which the current wave impulse F would traverse the circuit if utilized.

By so alternately connecting the solenoids 12 and 13 of the hammer in circuit with the electric valves 23 and 24, any predetermined number of current wave impulses may be directed to the respective solenoids to produce an operating force of relatively great value and long duration.

The employment of an inductive or transformer device 22 to provide an artificial neutral point, enables me to utilize a hammer having single winding solenoids, and to energize such windings, respectively, by overlapping cumulatively effective current wave impulses.

In Fig. 3 is illustrated a switching means which I employ in controlling a system as illustrated in Fig. 2. The switching elements illustrated schematically as switches 25, 26 and 27 in Fig. 2, are embodied in a synchronous switching device 35 comprising a synchronous motor 36 and a drum 37 driven thereby together with four collector rings 38, 39, 40 and 41. The drum 37 (shown developed into a plane) consists of a cylinder of suitable insulating material on which are mounted four contact segments 42, 43, 44 and 45 having the relative lengths and disposition indicated. Four engaging contacts or fingers 46, 48 and 49 are electrically connected and supported on a movable arm 47 which may be shifted circumferentially relative to the drum to a position at which no arcing will occur. This position will correspond to some point at which the current value is zero between the successive wave impulses as illustrated in Fig. 4.

Assuming the transformer to have been connected to the source of energy 20 through the switch 21, the electric valves 23 and 24 will operate to transmit current and the synchronous motor 36 will be energized to rotate the drum 37. The motor 36 should be a two-pole motor and the speed of the drum should be reduced to one-third the synchronous speed of the motor by proper gears. For example, if the circuit 20 is a source of 60 cycle current, the synchronous speed of the motor 36 would be 3600 R. P. M. under which conditions the drum should rotate at a speed of 1200 R. P. M. if the hammer is to be energized as illustrated in Fig. 6. The speed of the drum may be defined in another way. Upon referring to Fig. 6, will be seen that two wave impulses will be transmitted to one solenoid and the next impulse is not utilized. The subsequent two impulses are transmitted to the second solenoid and the following impulse is not utilized. One cycle of events, therefore, involves an interval corresponding to the time involved in three complete cycles of the circuit voltage.

The speed of the drum should be such that the drum will rotate once in an interval of time corresponding to that required for a complete cycle of events, which in this case is equivalent to the time involved in three complete cycles of the circuit voltage.

When the polarity of the circuit 20 is such that the valve 23 transmits current, the circuit between the valve 23 and solenoid 12 will be closed through the collector ring 38, the contact segment 42, the contact fingers 46 and 48, the segment 44, collector ring 40, and the solenoid 12 to the neutral point 28 of the transformer through the trigger switch 17. The solenoid 12 will then be energized by a current impulse traversing the valve 23. After an interval corresponding to 180 electrical degrees from the time the valve 23 began to transmit current, the valve 24 will be effective to transmit current and the transmitted wave will overlap the wave transmitted by the valve 23, as illustrated in Fig. 6. Both waves will therefore be transmitted to the solenoid 12 to produce a powerful impulse of relatively long duration.

The subsequent wave is not utilized and the two next succeeding waves transmitted by the valves 24 and 23 respectively are then supplied to the solenoid 13 and cause it to actuate the core member 14 in a backward direction. After the energization of the solenoid 13 another current wave is permitted to pass unutilized and the subsequent two waves are then supplied to the solenoid 12 to actuate the core member in a forward direction again to strike the tool 15 to do useful work.

A complete cycle of events therefore includes the time during which the two waves A and B are supplied to the winding 12, the waves D and E supplied to the solenoid 13 and the intervals during which the solenoids are not energized corresponding to the time that would lapse during the passing of the waves C and F if they were utilized. The complete cycle of events therefore includes the time that would be required for the six current wave impulses to traverse the circuit or substantially the interval of time corresponding to three cycles.

In the preceding description, I have mentioned the waves C and F as being unutilized. Such waves do not actually traverse the hammer since there is no demand upon the circuit for current at that time. They are merely shown in the accompanying graph to illustrate the relative positions they would occupy if they traversed the circuit. The composite impulses supplied to the solenoids are separate and distinct, each comprising the two overlapping component current wave impulses transmitted by the electric valves.

The operation of the switch 27 shown schematically as a simple transfer switch in Fig. 2, is accomplished by means of the contact segments 44 and 45 on the drum 37 together with the contact fingers 48 and 49 associated with the respective contact members. The function and operation of these contact members are exactly the same as is illustrated in the simple fashion by the transfer switch 27 in Fig. 2. The windings of the solenoids 12 and 13, respectively, are connected to the segments 44 and 45, and when the drum 37 is rotated by the synchronous motor 36 the solenoids are successively connected in circuit with the contact segments 42 and 43 and the associated electric valves 23 and 24 to be energized therefrom. The operation is such that both valves transmit a composite current wave impulse to one solenoid and the circuit connections are then transferred to the other solenoid to permit both valves to transmit a composite current wave impulse to the latter solenoid.

By means of the arrangement which I have here illustrated, I am enabled to employ a reciprocating motor having single winding solenoids and to energize each solenoid by overlapping cumulatively-effective current wave impulses to produce relatively large operating forces of long duration, operating strokes of such character render the motor suitable as a percussive tool in applications requiring high power and slow speed strokes.

My invention is not limited to the specific arrangement that is illustrated but may be variously modified without departing from the spirit and scope of the invention as set forth in the appended claims.

I claim:

1. The combination with a reciprocating motor embodying two operating windings, and an alternating current circuit for supplying energy thereto, of means for controlling the energization of the motor comprising a plurality of electric valves adapted to be connected between the motor and the circuit, and synchronous switching means controlled from the circuit for alternately connecting the valves in succession to each winding to supply a predetermined number of overlapping current wave impulses thereto.

2. The combination with a reciprocating motor embodying two windings, and an alternating current circuit for supplying energy thereto, of means for causing the motor to operate at a frequency that is a function of the circuit voltage frequency, comprising polarity-selective current-transmitting means, switching means therefor, and a selective switch for connecting the switching means to the respective windings successively.

3. The combination with a reciprocating motor embodying two windings, and an alternating current circuit for supplying energy thereto, of means for causing the motor to operate at a frequency that is a function of the circuit voltage frequency, comprising two polarity selective current transmitting devices, a switch for connecting each device in the operating circuit of the motor, and a switch for connecting the devices to the respective windings in succession.

4. The combination with a reciprocating motor embodying two windings, and an alternating current circuit for supplying energy thereto, of means for causing the motor to operate at a frequency dependent upon but lower than that of the circuit voltage frequency, comprising means for establishing an artificial neutral point, means for connecting the windings alternately between the artificial neutral point and each conductor of the circuit in succession, and means for passing through each winding while connected between said neutral point and each conductor a composite uni-directional current impulse comprising rectified dephased components.

5. The combination with a reciprocating motor embodying two windings and a source of alternating current, of an electric valve connected to each terminal conductor of the source, a switch for connecting each valve to an operating circuit, and a second switch for connecting either motor winding to the operating circuit for permitting a predetermined number of dephased uni-directional current impulses to pass from said source to said winding.

6. The combination with a reciprocating motor embodying two windings and a source of alternating current, of means for controlling the supply of current to the motor comprising a selective switch for selecting either winding of the motor, an electric valve associated with each terminal of the source for connecting the selected winding thereto, and switching means for controlling the connection of the valves to the selected winding to permit the transmission of a predetermined number of current waves.

7. The combination with a reciprocating motor embodying two windings and a source of alternating current, of a plurality of electric valves, and means including selective switching means for the windings and timing switching means for the valves for controlling the operation of the motor, said selective and timing switching means being controlled from said alternating current source.

8. The combination with a reciprocating motor provided with two operating windings, and an alternating current circuit, of an autotransformer connected to said circuit, means connecting each winding to a midpoint on the transformer, an electric valve connected to each conductor of the circuit, and switching means controlled by said alternating current circuit for alternately connecting the valves to each winding for permitting passage therethrough of a composite uni-directional current impulse comprising rectified dephased components.

9. The combination with a reciprocating motor provided with two windings and a source of alternating current therefor, of means for alternately supplying to each winding a plurality of successive current wave impulses from the circuit, said means comprising an electric valve associated with each conductor of the circuit, an autotransformer connected to the circuit, and selective switching means controlled by said source of alternating current for connecting the motor windings between the valves and the autotransformer.

10. The combination with a reciprocating motor provided with two windings and a source of alternating current therefor, of means for alternately supplying to each winding a plurality of successive current wave impulses from the circuit, said means comprising an electric valve associated with each conductor of the circuit, an autotransformer connected to the circuit, and a synchronous-motor-driven switching device for operatively connecting the autotransformer, the windings and the valves.

11. The combination with a reciprocating motor provided with two windings and a source of alternating current therefor, of means for alternately supplying to each winding a plurality of successive current wave impulses from the circuit, said means comprising an electric valve associated with each conductor of the circuit, an autotransformer connected to the circuit, and a synchronous switching device controlled from the circuit for controlling the operative connection of the windings between the autotransformer and the valves.

12. The combination with a reciprocating motor provided with two windings and a source of alternating current therefor, of means for alternately supplying to each winding a plurality of successive current wave impulses from the circuit, said means comprising an electric valve associated with each conductor of the circuit, an autotransformer connected to the circuit, and switching means connected between said valves and windings including cooperatively related selective-switching elements in series with timing-switching elements for connecting the motor windings in operative relation to the autotransformer and the valves.

13. The combination with a reciprocating motor provided with two windings, and a source of alternating current therefor, of an autotransformer connected to the circuit, an electric valve connected to each conductor of the circuit, and switching means for connecting the windings between the auto-transformer and the valves, said means comprising a synchronous motor, a drum driven thereby, and contact segments and switches engaging them to complete electrical connections to predetermined segments.

14. The combination with a source of alternating current, of a reactance connected across the terminals of said source, a translating device having a terminal adapted to be connected to one terminal of said source, a second translating device having a terminal adapted to be connected to the other terminal of said source, a connection from the other terminals of said translating devices to a point intermediate the terminals of said reactance, a pair of asymmetric conductors, means for bringing said translating devices alternately into circuit with said asymmetric conductors and said source of current, and means cooperatively related to said first-named means for bringing said asymmetric conductors in succession into circuit.

15. The combination with a source of alternating current, of a reciprocating motor having a field-producing winding and a reciprocating core element, asymmetrical conductors connected to said source, means controlled by said alternating current source for passing a plurality of uni-directional current impulses from said source to said winding by way of said conductors for effecting a stroke of said core element in one direction, and means for moving said core in opposite direction.

16. The combination with a source of alternating current, of a reciprocating motor having a field-producing winding and a reciprocating core element, asymmetrical conductors connected to said source, synchronous switching means controlled by said alternating current source for passing a plurality of uni-directional current impulses from said source to said winding by way of said conductors for effecting a stroke of said core element in one direction, and means for moving said core in opposite direction.

17. In a system comprising a reciprocating motor having a pair of field windings and an element reciprocated thereby, a source of single phase alternating current, and means for rectifying said current, the method of effecting reciprocation of said element at a frequency lower than and dependent upon the frequency of said alternating current, which comprises rectifying current from said source to produce de-phased overlapping uni-directional current impulses; and passing alternately through said field windings, for effecting reciprocation of said element in opposite directions, trains of said over-lapping uni-directional impulses at a rate dependent upon the frequency of said alternating current.

18. In a system comprising a reciprocating motor having a pair of field windings and an element reciprocated thereby, a source of single-phase alternating current, and asymmetrically conducting means in circuit with said source and windings, the method of effecting reciprocation of said element at a frequency lower than and dependent upon the frequency of said alternating current, which comprises deriving from said source by asymmetrical conduction successive overlapping uni-directional current impulses; and passing alternately through said field windings, for effecting reciprocation of said element in opposite directions, trains of said over-lapping uni-directional impulses at a rate dependent upon the frequency of said alternating current.

In testimony whereof, I have hereunto subscribed my name this 17th day of May, 1924.

SOLOMON KATZ.